US012573183B2

(12) United States Patent
Xiang et al.

(10) Patent No.: US 12,573,183 B2
(45) Date of Patent: Mar. 10, 2026

(54) HUMAN-CENTRIC VISUAL DIVERSITY AUDITING

(71) Applicant: Sony Group Corporation, Tokyo (JP)

(72) Inventors: Alice Xiang, Seattle, WA (US); Jerone Andrews, Tokyo (JP); Przemyslaw Kamil Joniak, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 437 days.

(21) Appl. No.: 18/302,257

(22) Filed: Apr. 18, 2023

(65) Prior Publication Data

US 2023/0343075 A1      Oct. 26, 2023

Related U.S. Application Data

(60) Provisional application No. 63/494,893, filed on Apr. 7, 2023, provisional application No. 63/363,436, filed on Apr. 22, 2022.

(51) Int. Cl.
| | |
|---|---|
| *G06V 10/774* | (2022.01) |
| *G06V 10/74* | (2022.01) |
| *G06V 10/77* | (2022.01) |
| *G06V 40/16* | (2022.01) |
| *G06V 40/20* | (2022.01) |

(52) U.S. Cl.
CPC ........ *G06V 10/7753* (2022.01); *G06V 10/761* (2022.01); *G06V 10/7715* (2022.01); *G06V 40/171* (2022.01); *G06V 40/20* (2022.01)

(58) Field of Classification Search
CPC ............. G06V 10/7753; G06V 10/761; G06V 10/7715; G06V 40/171; G06V 40/20; G06V 40/172; G06V 40/178
See application file for complete search history.

(56) References Cited

U.S. PATENT DOCUMENTS

| | | | |
|---|---|---|---|
| 2019/0005313 A1* | 1/2019 | Vemulapalli | G06V 10/454 |
| 2022/0147765 A1* | 5/2022 | Faraki | G06N 3/04 |
| 2023/0029988 A1* | 2/2023 | Yoshida | G06V 40/172 |

OTHER PUBLICATIONS

Josephs, E.L. et al. (Dec. 2021. "Emergent dimensions underlying human understanding of the reachable world.") (Year: 2021).*
Kolling, Camila, et al., "Mitigating Bias in Facial Analysis Systems by Incorporating Label Diversity", Apr. 13, 2022, arXiv:2204. 06364v2 [cs.CV], IEEE.
Ryu, Hee Jung, et al., "InclusiveFaceNet: Improving Face Attribute Detection with Race and Gender Diversity", Dec. 1, 2017, 2018 Workshop on Fairness, Accountability, and Transparency in Machine Learning.

* cited by examiner

*Primary Examiner* — Wassim Mahrouka
(74) *Attorney, Agent, or Firm* — INNOVATION CAPITAL LAW GROUP, LLP; Vic Lin

(57) ABSTRACT

A methodology for auditing the visual diversity of unlabeled human face image datasets uses a set of core human interpretable dimensions derived from human similarity judgments. Given a face image, a model can output dimensional values aligned with the human mental representational space of faces, where values not only express the presence of a feature, but also its extent. Since the model can be learned entirely from human behavior, the learned dimensions are not biased toward features that are easier to verbalize or quantify.

15 Claims, 8 Drawing Sheets

| | | |
|---|---|---|
| Ancestry 0.31 | Bushy eyebrows 0.79 | Indian 0.9 |
| Skin color 0.15 | Black hair 0.73 | Latino Hispanic 0.69 |
| Facial expression 0.13 | 5 o'clock shadow 0.67 | 30-39 0.6 |

| | | |
|---|---|---|
| Age related 0.32 | Gray hair 0.89 | 50-120 0.86 |
| Ancestry 0.15 | Eyeglasses 0.71 | Indian 0.63 |
| Hair color 0.15 | Double chin 0.66 | Southeast Asian 0.58 |

600

VISUAL DIVERSITY AUDITING ENGINE
650

TRAINING DATASET
652

TEST DATASET
654

CORE SET OF
DIMENSIONSL
656

CPU
602

HDD
604

RAM/ROM
606

616

KEYBOARD
608

MOUSE
610

DISPLAY
612

COMM.
INTERFACE
614

HUMAN-CENTRIC VISUAL DIVERSITY AUDITING

CROSS-REFERENCE TO RELATED APPLICATIONS

This application claims the benefit of priority of U.S. provisional patent application no. 63/363,436, filed Apr. 22, 2022, and U.S. provisional patent application No. 63/494, 893, filed on Apr. 7, 2023, the contents of which are herein incorporated by reference.

BACKGROUND OF THE INVENTION

1. Field of the Invention

Embodiments of the invention relate generally to face image dataset evaluation systems and methods. More particularly, embodiments of the invention relate to methods and systems for that enabling users to evaluate the diversity of faces in unlabeled collections along a set of human-interpretable axes, which represent perceptual properties with which faces are encoded.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Machine learning models invariably depend on the source of their experience, i.e., the data that they are trained (and evaluated) on. Dataset idiosyncrasies direct the functional behavior of any model that employs it. For instance, a facial super-resolution model may hallucinate features correlated with oversampled subgroups, resulting in the inadvertent erasure of minority groups. Therefore, it is important that a dataset is an accurate reflection of the underlying distribution. In particular, human-centric face image datasets should convey the visual diversity that exists within and across all subgroups.

The canonical approach is to discretize people using labels that cognate with demographic attributes. Conventional approaches equate diversity with parity in the empirical marginal subgroup label distributions. However, discretizing intrinsically continuous factors of variation such as gender, ethnicity, and race masks the extent, and continuous nature, of human phenotypic diversity. Moreover, considering the collection and use of demographic data is legally constrained, label distributions are often unknown. This raises the question of how the degree of diversity of faces within a dataset be characterized.

A dataset is biased if particular subgroups are disproportionately sampled from the underlying population. For historical and representational reasons, sampling bias is effectively an intrinsic property of all datasets. This is especially problematic when it results in models that are discriminatory or depend on spurious correlations-learned associations that do not always hold. Among bias mitigation approaches, reweighting and resampling are common. Such preprocessing techniques, however, require labeled subgroups, without which it is extremely difficult to ameliorate disparate outcomes. Notably, the subgroups typically center on highly changeable, situational social constructs such as race and gender. Depending on the granularity of the subgroups, disparities might easily be masked.

Consider, for example, racial categories which indiscriminately dissolve interethnic group differences. This is a principal issue with using labeled control sets for estimating mismatches between population and sampling proportions. Furthermore, data protection regulation critically limits the use and collection of this type of data. Thus, in the vision domain, a more nuanced approach would be to mitigate bias on the basis of a set of externally visible characteristics rather than societally constructed ones.

Since most prevailing human-centric face image datasets are web-scraped, attributes postulated as relevant by researchers are typically annotated by crowd workers. However, intrinsically continuous factors of variation related to age, gender, and race are often operationalized as binary, or discretized, and therefore do not reflect the extent, or continuous nature, of human phenotypic diversity. This can result in highly subjective annotations based on normative assessments. That is, the annotations depend on an annotator's visual perception of their congeners, which is influenced by their sociocultural background. For instance, not only is color perceived differently, but also horizontal—vertical ratio. Variability in proportion perception suggests that physical appearance might be perceived differently.

Notably, there has been a recent shift toward identifying concepts encoded in neural network units. In particular, research has focused on characterizing, textualizing, or visualizing units based on their sensitivity to specific types of labeled input.

In view of the foregoing, there is a need for methods and systems for that enabling users to evaluate the diversity of faces in unlabeled collections along a set of human-interpretable axes.

SUMMARY OF THE INVENTION

Aspects of the present invention provide an automated tool that can enable users to evaluate the diversity of faces in unlabeled collections along a set of human-interpretable axes, which represent perceptual properties with which faces are encoded.

Aspects of the present invention can complement and extend recent scholarship examining the mental representations of objects derived from human similarity judgments. In contrast to conventional methods, embodiments of the present invention can focus on the mental representational dimensions in the domain of human faces. To do so, embodiments of the present invention can collect, and make publicly available, a novel observational dataset of 0.75 million face similarity judgments using a set of 4921 representative examples. This most likely represents the largest face similarity dataset of its kind. At a high-level, embodiments of the present invention can leverage these similarity judgments to learn human interpretable face embeddings, where dimensional values reflect the extent to which an attribute is expressed given a face image. Notably, unlike previous work, embodiments of the present invention can extract representations for images beyond the set of representative examples without necessitating further data collection. Moreover, since the model, according to embodiments of the present invention, can be completely learned through comparisons, the resulting dimensions are not biased toward features that are easier to quantify (e.g., hand-crafted facial coding) or verbalize (e.g., attribute-listing).

Aspects of the present invention can apply a model to the task of dataset auditing, leveraging learned axes to surface hidden attribute disparities. Similar in spirit to recent bias detection tools, the model dimensions, according to embodiments of the present invention, can highlight unrepresentative patterns in face datasets. However, unlike prior tools, the method, according to embodiments of the present invention, can provide insights into unlabeled collections without the aid of external pretrained models.

Beyond auditing, aspects of the present invention can demonstrate how human-interpretable face-varying dimensions can be used to traverse the latent space of a pretrained generative model, such that embodiments of the present invention can synthesize images with desired properties. This can enable a user to generate a diverse set of samples from the latent space of pretrained generative models in a manner that is aligned with the human mental representational space of faces. This can be accomplished without labeled sets of exemplars or pretrained attribute classifiers.

Aspects of the present invention can additionally collect demographic information from each annotator (which can also make publicly available), and can measure the extent to which dimensions are shared between different individuals and whether dimensional importance is influenced by an annotator's demographic attributes. Similar to subspaces induced by conditional similarity networks, embodiments of the present invention can leverage annotator labels to learn masks that reweight dimensions such that embodiments of the present invention can induce subspaces encoding each annotator's notion of similarity.

Embodiments of the present invention further provide a method for implicitly deriving a set of core human-interpretable dimensions from a set of images comprising providing a plurality of image triplets, selected from a set of images, to a plurality of participants on a display; receiving an input from each of the plurality of participants for each of the plurality of image triplets, where the input chooses one of the images of each of the plurality of image triplets that is most dissimilar of the image triplet, wherein each input provides a human similarity judgment; and learning the set of core human-interpretable dimensions derived from the human similarity judgments.

Embodiments of the present invention provide a method of auditing a visual diversity of an unlabeled human face image dataset comprising training a model by steps comprising providing a plurality of image triplets, selected from a set of images, to a plurality of participants on a display, receiving an input from each of the plurality of participants for each of the plurality of image triplets, where the input chooses one of the images of each of the plurality of image triplets that is most dissimilar of the image triplet, wherein each input provides a human similarity judgment, and learning the set of core human-interpretable dimensions derived from the human similarity judgments. The method further comprises analyzing the unlabeled human face images dataset for visual diversity by ranking images of the dataset into the set of core human-interpretable dimensions, wherein the unlabeled human face images are ranked for both presence of each of the set of core human-interpretable dimensions, an extent thereof.

These and other features, aspects and advantages of the present invention will become better understood with reference to the following drawings, description and

BRIEF DESCRIPTION OF THE DRAWINGS

Some embodiments of the present invention are illustrated as an example and are not limited by the figures of the accompanying drawings, in which like references may indicate similar elements.

Figures 1A, 1B:
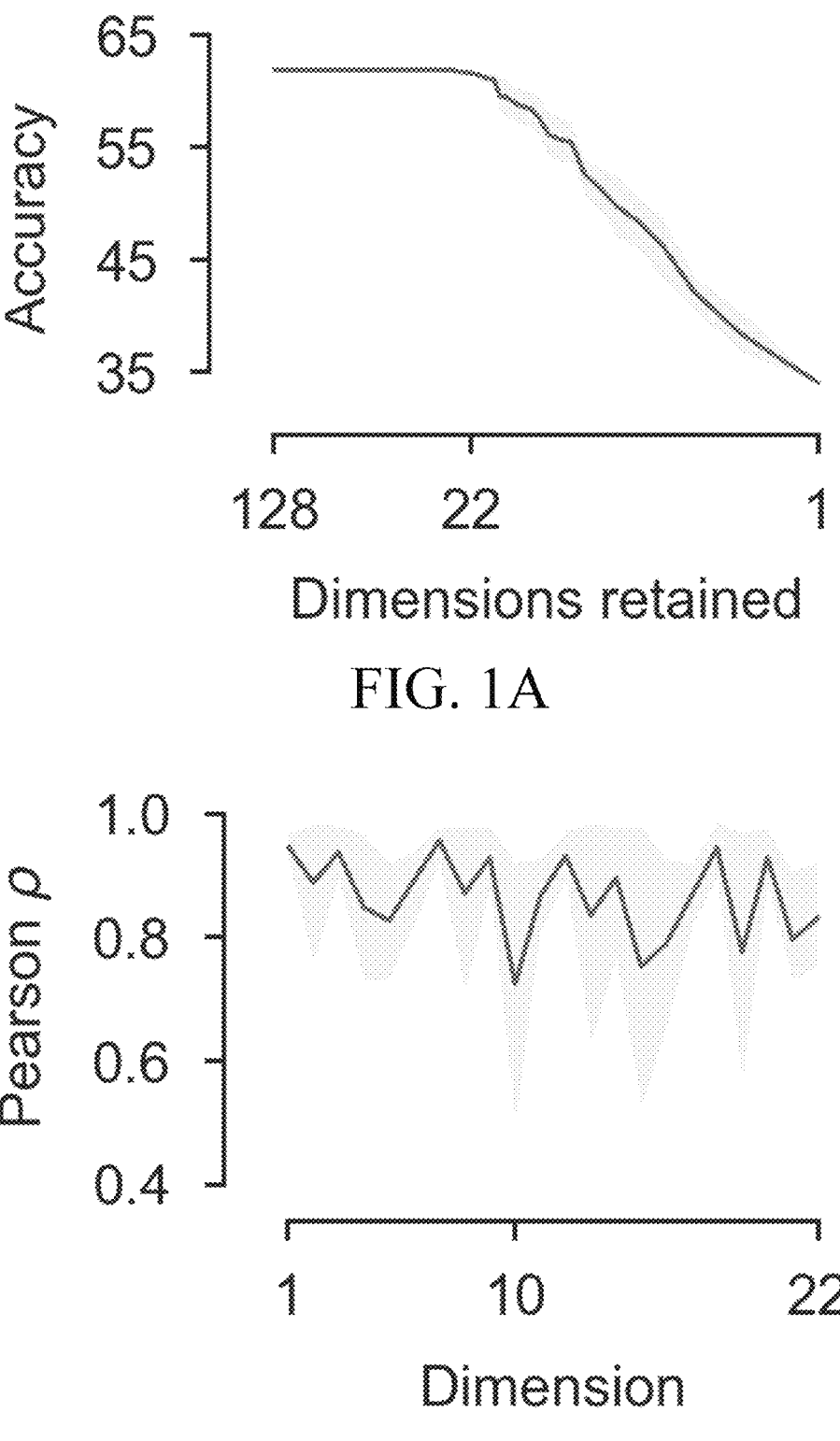
FIG. 1A illustrates validation accuracy as a function of the number of dimensions retained over five independent runs (95% CI), empirically evidencing that the judgments can be encapsulated using a limited number of dimensions.
FIGS. 1B and 1C illustrates Pearson and Spearman r between each of the 22 dimensions and the best "matching" dimension from each of the other four runs (95% CI), empirically evidencing the replicability of dimensions.

Unless otherwise indicated, the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

As is well known to those skilled in the art, many careful considerations and compromises typically must be made when designing for the optimal configuration of a commercial implementation of any method or system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a methodology for auditing the visual diversity of unlabeled human face image datasets using a set of core human interpretable dimensions derived from human similarity judgments. Given a face image, a model can output dimensional values aligned with the human mental representational space of faces, where values not only express the presence of a feature, but also its extent. Since the model can be learned entirely from human behavior, the learned dimensions are not biased toward features that are easier to verbalize or quantify.

One aspect of the present invention can implicitly derive a set of core human-interpretable face-varying dimensions by learning mental representations of faces from human behavioral similarity judgments alone. Given image triplets, participants were tasked with choosing the object image most dissimilar to the other two (e.g., the odd-one-out). The task is motivated by the observation that by exchanging an object image in a triplet for another, the methods can implicitly sample over a miscellany of contexts in which objects might be experienced, thus permitting the identification of the relevant dimensions that contribute to pairwise similarity. This is in contrast to pairwise similarity judgments (i.e., "Is A similar to B?"), where it is not always apparent to the viewer which dimensions are relevant, in particular when two objects are conceptually and perceptually different. Moreover, there is no need to pre-specify lists of features for comparison hypothesized as relevant, thus mitigating the possibility of including irrelevant dimensions while inadvertently omitting relevant ones.

A Visual Diversity Auditor for Faces

One aspect of the present invention is to implicitly derive a set of core human-interpretable face-varying dimensions by learning mental representations of faces from human behavioral similarity judgments alone. The dimensions can then be used to evaluate the visual diversity of unlabeled face image collections, similar in vein to audits conducted using demographic labels.

A Dataset of Human Behavioral Judgments of Face Similarity

As the dimensions learned by any embedding approach are determined by the stimuli, it is important that the set of representative examples are diverse. For instance, if there is no variation in apparent skin color, then skin color would constitute an irrelevant dimension since it cannot account for variation in the similarity judgments, and will therefore not be learned.

Representative examples. To learn the mental representational space of faces underlying human judgments of similarity, 4921 images were sampled from a face image dataset. The dataset includes 1024×1024 RGB images of aligned faces. Images that did not result in a single dlib face detection were excluded. Using the algorithmically estimated annotations from the dataset, only face images with an apparent age≥20 (in years), absolute head yaw and pitch angles≤$\pi$/6, no eyewear (transparent or opaque), and eye occlusion scores≤20/100 were considered. The purpose of these constraints was to exclude images of minors and reduce some of the extrinsic factors that may unduly influence human behavior. Nonetheless, since the images were captured in unconstrained settings many nuisance factors still exist (e.g., large variability in accessories, background, and lighting.) The set of 4921 representative examples was sampled such that each intersectional subgroup based on perceived binary gender expression, age group, and ethnicity is approximately balanced. To do so, the crowdsourced perceived binary gender expression and age group annotations from the dataset was used, and a pretrained FairFace classifier was used to estimate ethnicity. In total, there were 56 subgroups. To mitigate biasing the set toward stereotypical faces, images were randomly sampled from each subgroup rather than selecting the most confidently predicted or annotated.

Human similarity judgments. A large number (0.64 million) of unique triplet similarity judgments were collected on Amazon Mechanical Turk2 (AMT) from 1645 eligible participants. This represents $3 \times 10^{-3}$% of all possible triplets using the 4921 representative examples. Participant eligibility was determined through a prescreening survey, which corresponded to a multiple-choice English language proficiency test. In addition, the tasks were limited to workers who had previously completed a minimum of 100 human intelligence tasks (HITs) on AMT with a 95% approval rating.

Participants were paid a nominal fee for completing the prescreening survey. All participants provided informed consent as well as their demographic information (i.e., age, nationality, ancestry, and gender identity). To further ensure quality, judgments obtained from participants who provided overly fast, deterministic, or incomplete judgments were excluded.

Learning Interpretable Face Representations

At a high-level, aspects of the present invention aim to learn representations, where each dimension corresponds to a face-varying dimension. Using gradient descent, conventional methods learned a low-dimensional sparse, non-negative embedding matrix of 1854 object concepts. The embeddings were both predictive of individual triplet trial behavior (in the odd-one-out task) and interpretable. While the human participants observed triplets composed of images representing object concepts, the embeddings were trained using one-hot categorical image encodings. Therefore, for an arbitrary image, say x', extraneous to the set of representative example images $\{x_i\}_{i=1}^{c}$ of c concepts, if x' belongs to one of the learned concepts, say $y_i$, then the already trained concept embedding of $x_i$, namely $\omega_i$ can be used. However, this does not take into account that x' may look visually different to the original image, $x_i$, which led to $\omega_i$. That is, the human behavioral judgments depend on the specific exemplar used. Consequently, regardless of whether x' belongs to one of the c categories, new judgments need to be collected and the embeddings need to be retrained. This is not scalable, as it should be done for each and every new image. This is especially problematic when one considers that embodiments of the present invention aim to interpret unlabeled collections of face images.

Learning a generalizable mapping. Rather than working with categorical inputs $y_i$, embodiments of the present invention work directly with the images $x_i$. This amounts to learning a differentiable function $f_\theta: x_i \mapsto f_\theta(x_i) = \omega_i \in \mathbb{R}^d$, parametrized by $\theta$, where $\omega_i$ denotes the representation of $x_i$. In the framework, $f_\theta$ is realized as a convolutional neural network. This represents an obvious solution to the problem, since for any arbitrary image, $x'$, its representation $w_i$ can be computed. Given a training set of n triplet-judgment tuples $\{(( x_{i\ell}, x_{je}, x_{k\ell} ), k)\}_{\ell=1}^n$, where to simplify notation, it is assumed that the odd-one-out judgment is always k, and $\theta$ is optimized by minimizing $$\mathcal{L}(\theta) = -\frac{1}{n}\sum_\ell \log\left(\frac{\exp(\omega_{i\ell}^T\omega_{j\ell})}{\exp(\omega_{i\ell}^T\omega_{j\ell}) + \exp(\omega_{i\ell}^T\omega_{k\ell}) + \exp(\omega_{j\ell}^T\omega_{k\ell})}\right) + \quad (1)$$

$$\lambda_1 \sum_i \|\omega_i\|_1 + \lambda_2 \sum_{ij}\max(0, -\omega_{ij})$$

The first term in Eq. (1) is a modified version of a distance ratio loss, which intuitively encourages similar faces to have similar representations such that their dot product is larger than when paired with a dissimilar face representation. The second term is an $L^1$ norm loss promoting sparsity: Not all dimensions are expected to manifest in every face. For interpretability, the third term penalizes negative values, as a consequence representations are formed by stacking dimensions (akin to structures built from building block pieces), where each dimension indicates the presence (or absence) of a particular feature. Moreover, when dimensions are both non-negative and continuous, dimension values not only indicate feature presence but the extent to which they are expressed. Weights controlling the sparsity level and non-negativity penalty are denoted $\lambda_1 \in R$ and $\lambda_2 \in R$, respectively.

It is anticipated that embodiments of the present invention will learn the core dimensions driving human behavioral judgments of face similarity. Moreover, it is expected that these dimensions can generalize to novel face images, i.e., beyond the set of representative examples. Since the learned axes are trained such that pairs of similar faces result in larger dot products than dissimilar pairs of faces, it is hypothesized the dissimilarity between face pairs can be used as a measure of diversity.

Figure 1C:
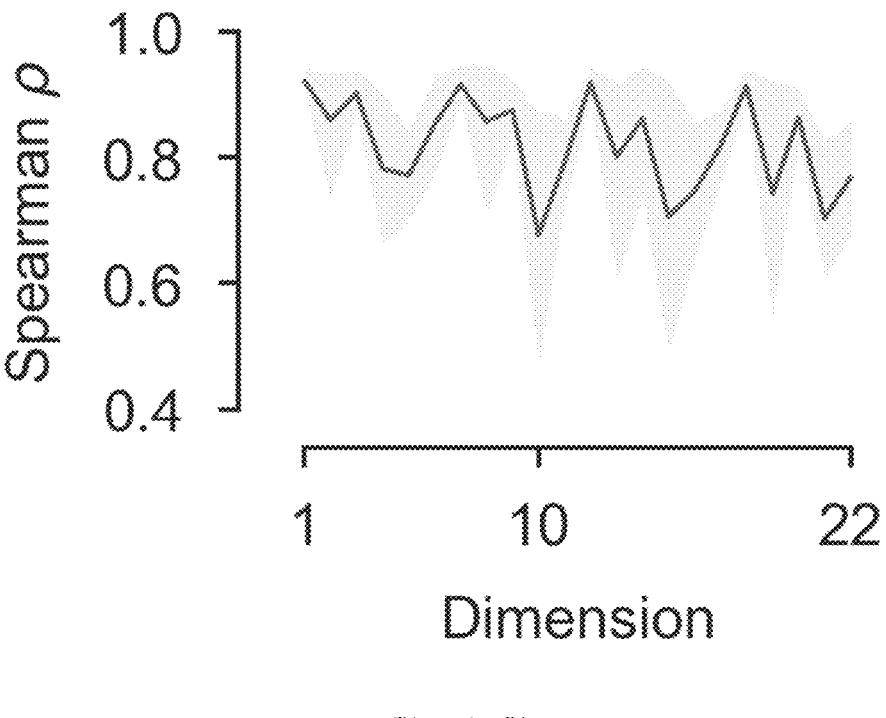

Implementation. The model $f_\theta$ can utilize a ResNet18 architecture, outputting 128-dimensional non-negative embeddings. Training was performed on 0.64 million triplets with 10% reserved for validation. All images were resized to 128×128 and normalized to [−1, 1]. Standard data augmentation was used (horizontal mirroring and 112×112 random crops). Guided by the validation loss, the method can empirically set $\lambda_1 = 5 \times 10^{-5}$, $\lambda_2 = 1 \times 10^{-2}$, and $\lambda_3 = 1 \times 10^{-4}$ optimization, a core set of dimensions was obtained by dispensing with those whose maximal value was close to zero (i.e., 0.01), resulting in a low-dimensional space comprising 22 dimensions. The threshold was determined based on maximizing accuracy (61.9%) on the validation set. Across five independent runs, the 95% confidence interval (CI) for the number of dimensions and validation accuracy were 27.4±5.8 and (61.9±0.1) %, respectively. FIGS. 1A through 1C show that the judgments can be encapsulated using a limited number of the available dimensions and that the 22 dimensions are approximately replicated across the independent runs.

Predicting Human Behavioral Judgments

Prior to examining the interpretability and applicability of the model, the utility of the dataset is first validated for learning a model that is predictive of human behavior and generalizes to novel images.

Baselines. To contextualize the representations learned by the model, the representations are compared to representations extracted from pretrained face recognition and facial analysis models. Recognition models were considered that were trained on CASIA-Webface with softmax, ArcFace, CosFace, and SphereFace losses. For the analysis models, representations were explored from multi-label models trained on CelebA (40 binary face attribute labels) and FairFace (perceived binary gender expression, age, and race labels). The FairFace trained model has a ResNet34 architecture, whereas all other models use a ResNet18 architecture. All models output 512-dimensional embeddings normalized to unit length.

Results. Same images, novel triplets. One thousand unique triplets were sampled from the set of 4921 representative examples. The sampled triplets (not the images) are disjoint from those used for training (and validating) the model. For each triplet, 25 judgments were collected on AMT resulting in 25,000 judgments. To provide an accuracy upper bound of the predictive performance of any model given the stochasticity in human behavioral judgments, a model-free estimate was determined of the Bayes optimal classifier accuracy. For a given triplet with n judgments, the Bayes classifier predicts the outcome with the maximum probability. The accuracy upper bound was determined to be (64.9±1.0)% (95% CI), corresponding to the average probability of the majority outcome over the n triplets. Table 1, below, reports the predictive accuracy on the 25,000 judgments with the model attaining the highest accuracy 61.5%. This shows that the model generalizes to novel triplets, despite learning on a fraction of all possible triplets (3×10−3%) constructed from only 4921 unique images. In addition, Table 1 reports the entropy inherent to the triplet judgments. The uncertainty in the judgment output probabilities from the model have the highest correlation with human uncertainty (Pearson r=0.67 (PCC H(X)) and Spearman r=0.64 (SCC H(X))). This suggests that the model generalizes in a way that is consistent with the uncertainty underlying human behavior.

TABLE 1

| Model | Pres. Inv. | FairFace | CelebA | Softmax | ArcFace | CosFace | SphereFace |
|---|---|---|---|---|---|---|---|
| Accuracy | 61.5 | 56.8 | 48.6 | 47.4 | 46.8 | 43.5 | 48.9 |
| PCC H(X) | 0.67 | 0.44 | 0.23 | 0.28 | 0.24 | 0.23 | 0.30 |
| SCC H(X) | 0.64 | 0.42 | 0.19 | 0.23 | 0.17 | 0.14 | 0.26 | in Eq. (1), and can optimize $\theta$ for 40 epochs with default parameters, learning rate $1 \times 10^{-3}$, and batch size 32. Post- Novel images, novel triplets. The previous generalization test favored the model insofar as the triplet images had been

11 used for training. To better (and more fairly) measure the generalization ability of the model, and thus its utility as an automated tool, a diverse set was constructed of 56 novel images (one image per intersectional subgroup). All 27,720 possible triplets were sampled such that embodiments of the present invention could construct a human-generated similarity matrix $S \in R^{56 \times 56}$. For each triplet, three judgments were collected on AMT resulting in 83,160 judgments. $S_{ij}$ corresponds to the proportion of triplet judgments including $x_i$ and $x_j$, where $x_i$ and $x_j$ were deemed most similar (i.e., neither were selected as the odd-one-out). Table 2, below, reports accuracy on the 83,160 triplet judgments, and the correlation between the human-generated matrix S and model-generated matrices $\hat{S}$. The model attains the highest accuracy 57.0%, evidencing its ability to generalize to triplets comprising novel images. Most significantly, the model-generated matrix $\hat{S}$ has the highest correlation with the human-generated matrix S (Pearson r=0.81 and Spearman r=0.84). Correlation is computed between each matrix's strictly upper triangular elements. What is most impressive is that the model dimensions are more predictive of, and better correlated with, human behavior than FairFace representations trained to predict perceived binary gender expression, age, and race labels.

12

The Dimensions are Human-Interpretable

Although it was shown, above, that the embeddings inferred by the model have a strong positive correlation with human mental representations, this does not mean that the individual dimensions are human-interpretable. As mentioned, by varying the third face in a triplet, the methods can implicitly sample over a variety of contexts in which faces may be encountered. Aspects of the present invention can understand which types of dimensions humans use when determining similarity. Specifically, aspects of the present invention can determine how important are different attributes to, and whether they explain, observed human behavior. Thus, embodiments of the present invention can use two interpretability tests where participants evaluate the coherence of the individual model dimensions.

Dimension labeling. If explanations of the meaning of a dimension are consistent then it would suggest that the dimension is interpretable. One way of qualitatively measuring interpretability is through a dimension labeling task. Given a dimension and the set of representative examples sorted in descending order based on their dimensional value, if the images with the highest values share salient visual characteristics, differentiating them from those with lower values, then it should be possible for a human to textualize

TABLE 2

| Model | Pres. Inv. | FairFace | CelebA | Softmax | ArcFace | CosFace | SphereFace |
|---|---|---|---|---|---|---|---|
| Accuracy | 57.0 | 53.4 | 46.9 | 43.8 | 41.8 | 39.8 | 44.1 |
| PCC | 0.81 | 0.74 | 0.48 | 0.39 | 0.32 | 0.23 | 0.40 |
| SCC | 0.84 | 0.74 | 0.46 | 0.36 | 0.29 | 0.21 | 0.37 |

Figure 2:
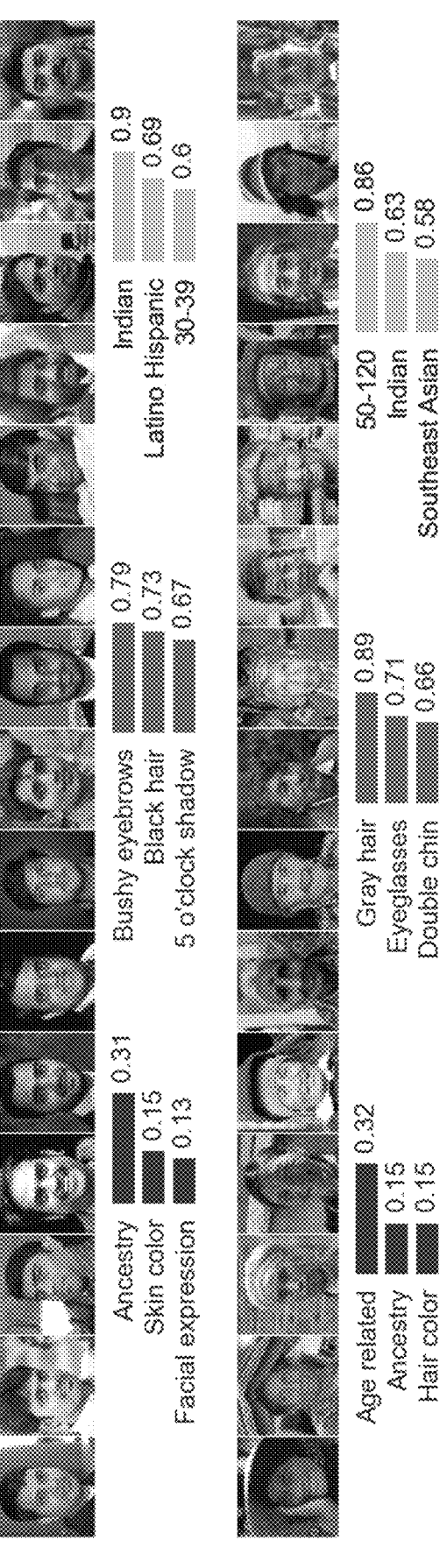
FIG. 2 illustrates the top three topics from labeling the dimensional scales 1 and 11 with the proportion that each topic represents and the top 10 images from these dimensions, where labels were gathered by observing the dimensional scale (left side); CelebA labels with AUC (middle); FairFace/FFHQ-Aging race demographic labels with AUC (right side)
Figure 3A:
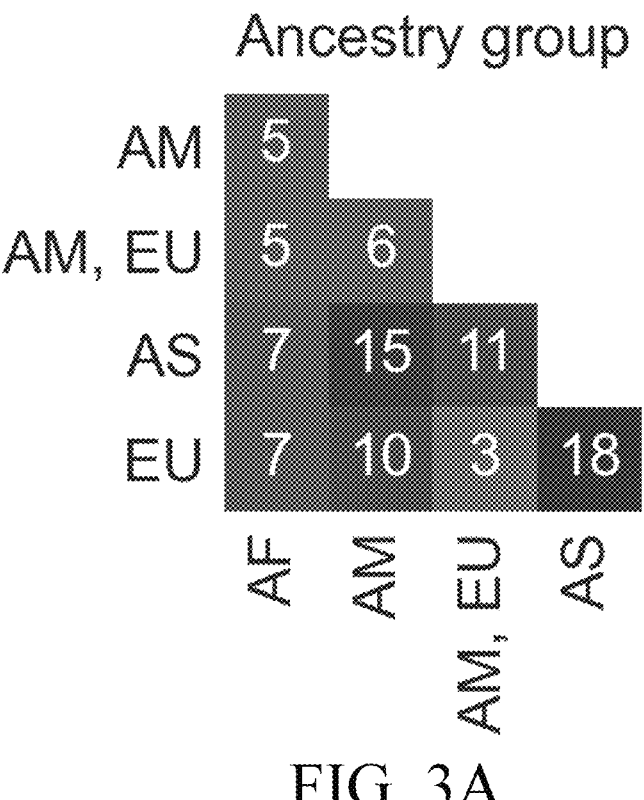
FIGS. 3A through 3D illustrates a number of mask dimensions that have a statistically significant difference between two demographic groups.
Figure 3B:
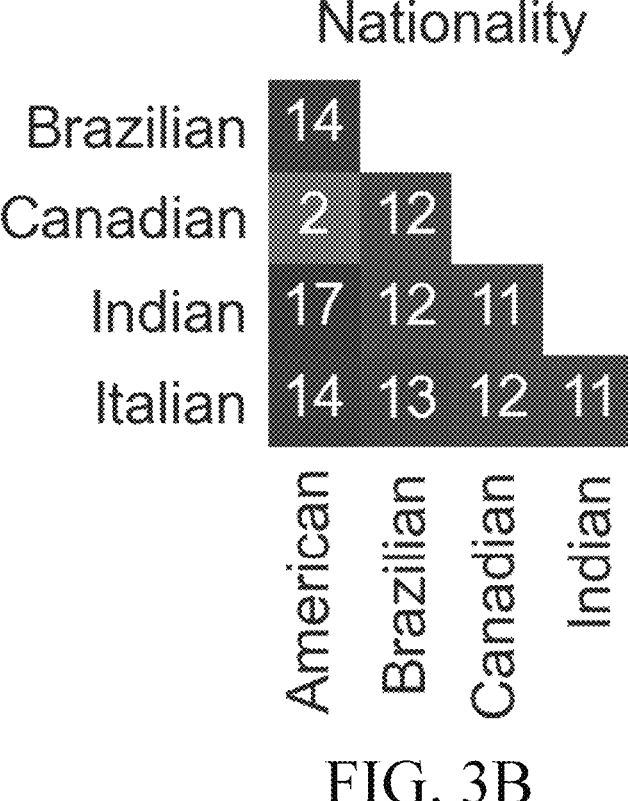
Figure 3C:
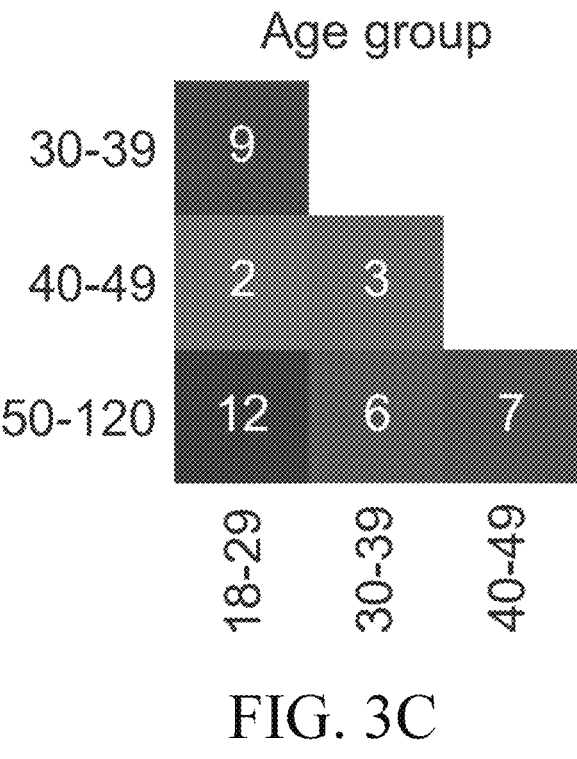
Figure 3D:
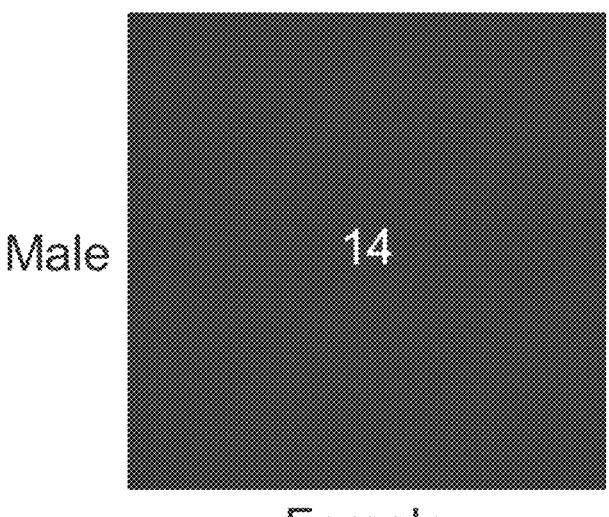

The results indicate that there exists a misalignment between the human mental representational space of faces and those induced by supervised recognition and analysis-based tasks. In recognition, one either implicitly (softmax loss) or explicitly (ArcFace, CosFace, SphereFace) optimizes for the learning of representations that jointly maximize intraclass similarity and minimize interclass similarity. In such cases, a face embedding can be thought of as a stable representation of some underlying identity (class), i.e., it is invariant to non-identity related factors of variation such as pose, lighting, and expression. However, it is also invariant to, for example, age, skin tone, and hair color, since they do not alter the underlying identity. The degree of invariance depends on the intraclass variation present within the training set. Given that the dataset constitutes predominantly distinct identity face images, it is unsurprising that representations trained to separate identities perform poorly: Recognition-induced embeddings of different identity faces are almost always approximately orthogonal. Conversely, representations induced by facial analysis tasks are more general, encoding visual properties of faces useful for attribute classification that are (in theory) invariant to "attributes" such as identity. Coarser non-identity specific representations are better suited to this similarity task, due to most comparisons being between two distinct classes. However, as previously mentioned, facial analysis tasks commonly require researchers to postulate relevant dimensions (labels) that images should be labeled across. When images are labeled in this way by humans, the results are based on normative assessments. When self-reported, there is an implicit assumption that the label is a sufficient descriptor, despite the fact that a binarized, or discretized, label does not convey the extent to which an attribute is expressed (or perceived).

the dimension's meaning. For each of the 22 dimensions, a scale was constructed (measurement units corresponded to dimensional values which were converted to percentiles) and participants were tasked with providing up to three labels. After quality control, there were 25-62 labels per dimension. The labels were then converted into 35 broad topic categories. FIG. 2 shows the top three topics for model dimensions 1 and 11, as well as the top three labels (i.e., those resulting in the highest AUCs per dimension) using CelebA, FairFace, and annotations. The topics indicate that the dimensions can be interpreted and that there is a correspondence between the labels gathered and those generated using CelebA, etc. Learning on the dataset of similarity judgments has resulted in dimensions that reflect to varying degrees perceptual attributes and their combinations such as age, gender expression, ethnicity (ancestry), skin color, face shape, hair length, nose shape, and hair color, as evidenced the labels offered by the participants.

Dimension rating. To quantitatively study the interpretability of the dimensions, participants were tasked with placing 20 novel face images along each of the 22 dimensions using the unlabeled scales from the dimension labeling task. As the scales were unlabeled, placement was determined solely on the visual similarity between the image to be placed and the images across the scales. If the dimensions are coherent (and thereby interpretable), then a participant should be able to accurately place a novel image on each scale. For each image, 20 judgments were collected per dimension, resulting in 8800 judgments. A human-generated similarity matrix $S \in R^{20 \times 20}$ was constructed by computing the mean judgment scale value per image for each dimension. The mean values were then converted back to their original percentile values such that a human-generated embedding was obtained for each image. The Pearson and Spearman correlation between the human-generated and the model-generated similarity matrix is r=0.76 and r=0.77, respectively. The strong correlation between the two matrices highlights the coherence and interpretability of the model dimensions. This shows that the model dimensions can be used as a tool for rating images, even when the meaning of a dimension is unknown to a participant. Therefore, rather than collecting categorical face image attribute annotations, one can instead obtain continuous values across a set of visually interpretable dimensions. The model dimensions offer a potential way to mitigate against the challenges of categorization by labels, in particular when one considers the limits of human demographic category definitions.

Modeling Annotator Attention

In the machine learning community, the role of the annotator has only recently entered into discourse, albeit predominantly in the context of natural language processing. In order to contextualize the dataset, and the resultant models, it is important to consider whose behavior are being recorded and subsequently modeled. With this in mind, one can determine to what extent are the model dimensions shared between different participants, and if the participants' demographic attributes are a contributing factor. As each triplet judgment in our dataset is associated with the annotator who generated it—as well as their demographic attributes—rather than pooling judgments across all annotators, embodiments of the present invention propose to utilize this information to study annotator attention.

Method. Concretely, each triplet-judgment tuple can be augmented such that the dataset becomes $\{(\{x_{il}, x_{jl}, x_{kl}\}, x_{kl}, a_q)\}_{i=1}^n$, where $a_q$ ($\forall_q \in \{1, \ldots, n'\}$) represents the annotator who generated the judgment. The probability was modeled of annotator $a_q$ selecting $x_{kl}$ as the odd-one-out as $$a \exp((g_M(a_q) \cdot f_\theta(x_{il}) \cdot (g_M(a_q) \cdot f_\theta(x_{jl})))), \qquad (2)$$

where $g_M$: $a_q \mapsto (m_q) = \sigma(M^T a'_q) \in \mathbb{R}^{d'}$, parametrized by the matrix $M \in \mathbb{R}^{d \times n'}$. Here $\alpha$ represents the sigmoid function and $a_q' \in \{0, 1\}^{n'}$ is a one-hot encoding of annotator $a_j$. The function $g_M$ maps annotator $a_q$ to a mask, $g_M(a_q)$, of the same dimensionality as the face embeddings. The mask plays the role of an element-wise gating function, down weighting dimensions less relevant to the annotator's decision-making processes. Notably, conditional similarity networks do this in order to induce subspaces which encode different notions of similarity (e.g., font style and character type). In embodiments of the present invention, the masks can be learned post hoc, i.e., using the pretrained, pruned model as a fixed feature extractor (which outputs 22-dimensional embeddings). The (n'=1645) masks are optimized by minimizing a modified version of Eq. (1), above, where, without loss of generality, $w_{it}$ is replaced by $g_M(a_q) \cdot f_\theta(x_{it})$, $w_i$ by $m_i$, and the $L^1$ norm loss by an $L^2$ norm loss.

Results. Using the learned annotator masks, a final validation accuracy of 64.2% was obtained (increased from 61.9% without any masks or equivalently with all mask values equal to 1). Thus, it was shown that predictive accuracy can be increased if it is known who made the judgment, i.e., their dimensional attention preference. However, what is of particular interest is whether there exists differences in dimensional mask values (i.e., dimensional attention) between annotator demographic groups. For this, masks are only considered that are associated with annotators who contributed at least 200 triplet judgments and groups with at least 50 annotators (i.e., 10 000 annotations). As shown in FIG. 3, Wilcoxon rank-sum tests provide evidence of a statistically significant difference (p-value<0.05) between the mask dimensions of different annotator groups. This shows that one should always aim for a diversity of perspectives when collecting datasets, in order to ensure that a variety of human behaviors are measured.

Characterizing the Dataset

So far, it has been shown that our model dimensions are both predictive and human interpretable. An aspect of the present invention includes a goal to leverage these face-varying axes to surface hidden attribute disparities within unlabeled face image datasets. Since dimensional values express the extent to which certain characteristics are expressed in a face, by aggregating embeddings, embodiments of the present invention can estimate the degree to which dimensional characteristics are expressed in datasets.

Method. In the Élö rating system, rating differences between two players directly correspond to each player's probability of winning. Given a pool of players, wide variability in the ratings increases the predictive power of aspects of the present invention, i.e., embodiments can more easily predict the outcome of a game. On the other hand, less heterogeneous ratings have the opposite effect, since rating differences between highly and lowly rated players is small. When the rating distribution of a game is unimodal, then one may regard the standard deviation of the distribution as a measure of skill, whereas for games of chance (requiring no skill) the standard deviation will tend to zero. Analogously, when the pairwise similarity distribution of a dataset is unimodal, the standard deviation of the distribution can be interpreted as a measure of diversity, where the standard deviation tends to zero for homogeneous face embeddings. Thus, embodiments of the present invention propose to use the standard deviation of similarity scores to compare datasets. Similarity scores were subsampled to produce confidence intervals for the mean standard deviation. To show that this is an effective measure, this is compared with the estimated demographic and attribute proportions within each dataset. In some embodiments, gender expression can be chosen as a focus, since it represents a widely studied attribute. A conventional dataset, minus the samples that were selected as representative examples, was chosen since it has human estimated gender expression labels.

Figure 4:
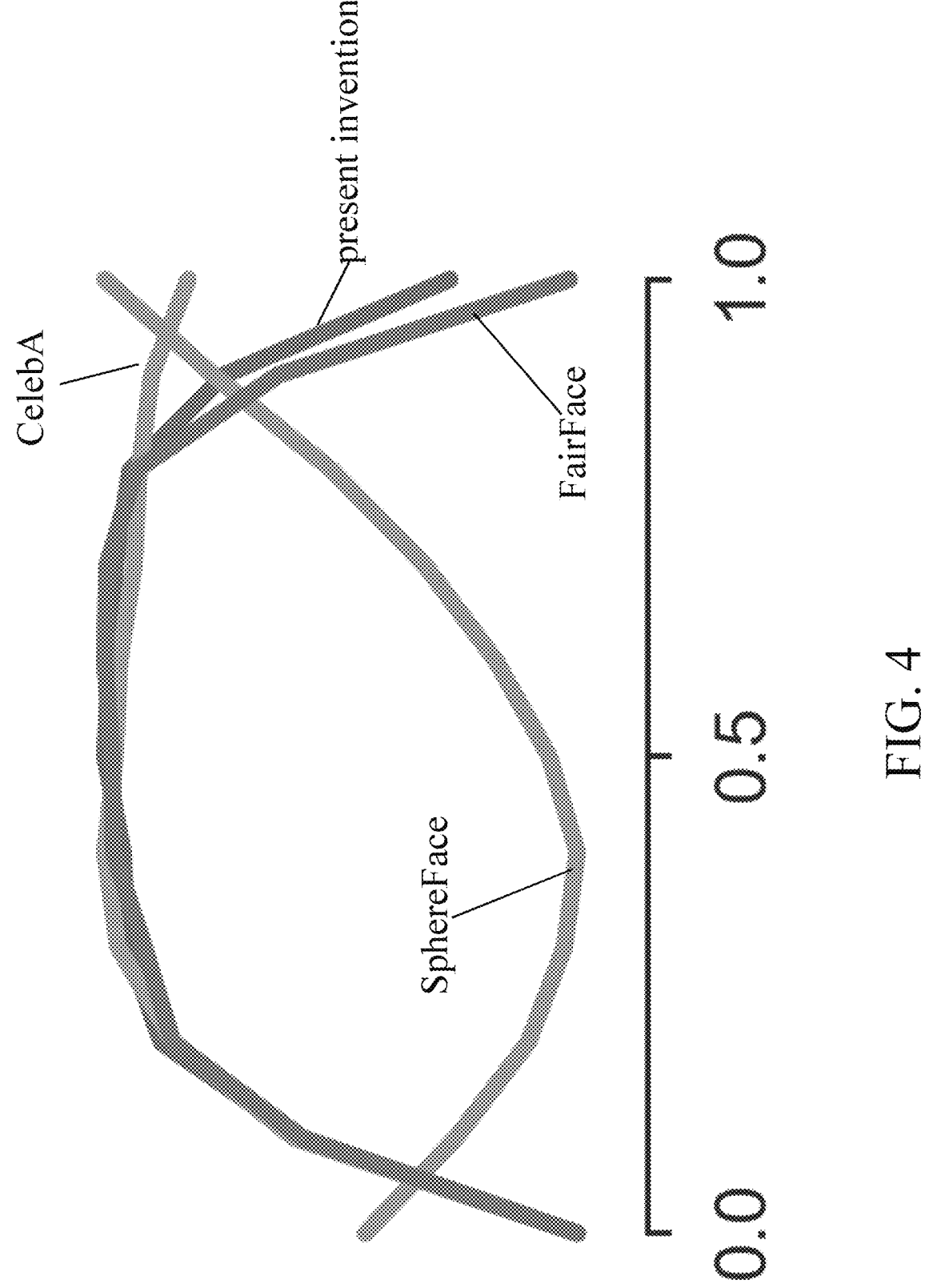
FIG. 4 illustrates a gender audit where varying the proportion (from 0 to 1) of feminine face images in subsamples, where each curve represents the present invention compared with the conventional methods of FairFace, CelebA, and SphereFace, where all curves are normalized for comparative purposes, where the y-axis corresponds to the standard deviation of similarity scores between pairs of face embeddings.

Results. FIG. 4 shows the results of this analysis. When varying the proportion of face images from one perceived binary gender expression to the other, is was seen that the optimal point with respect to diversity is centered around 0.5. Comparing representations from the model, according to an embodiment of the present invention, and those from FairFace, both result in the similarly shaped curves. Despite the model, according to embodiments of the present invention, never explicitly being trained to predict gender, it is able to accurately quantify the amount of diversity with respect to gender expression. Notably, the CelebA model (most likely due to its skewed training set) gives a high "diversity" score even when the dataset is comprised entirely of feminine face images; and the recognition induced model SphereFace exhibits the complete opposite behavior to the other models, as disparity is reduced as the similarity between the embeddings increases. To conclude, from the similarity scores, a diversity score can be generated that characterizes the diversity of the dataset across dimensions relevant to human perception. Nevertheless, while the standard deviation gives a metric for overall diversity, auditors can also look at the mean dimensional value score in order to ascertain which dimensions are lacking. For instance, using the model, according to embodiments of the present invention, it was found that the synthetic dataset Face Synthetics, which claims to capture diversity present within the human population, despite the identity basis used by their generative 3D face model having been learned on demographically skewed scans, had deficits corresponding to "face shape", "ancestry", and "weight related" dimensions. Similarly, these topics were highlighted when the Chicago Face Database was analyzed.

Traversing latent space in search of diversity. Having mentioned hidden dataset disparities, it can now be demonstrated how the human-interpretable face varying dimensions can be used to traverse the latent space of a pretrained generative model such that images are able to be synthesized with desired properties. The generated samples can then be used to augment imbalanced datasets such that representational disparity is mitigated.

Figure 5:
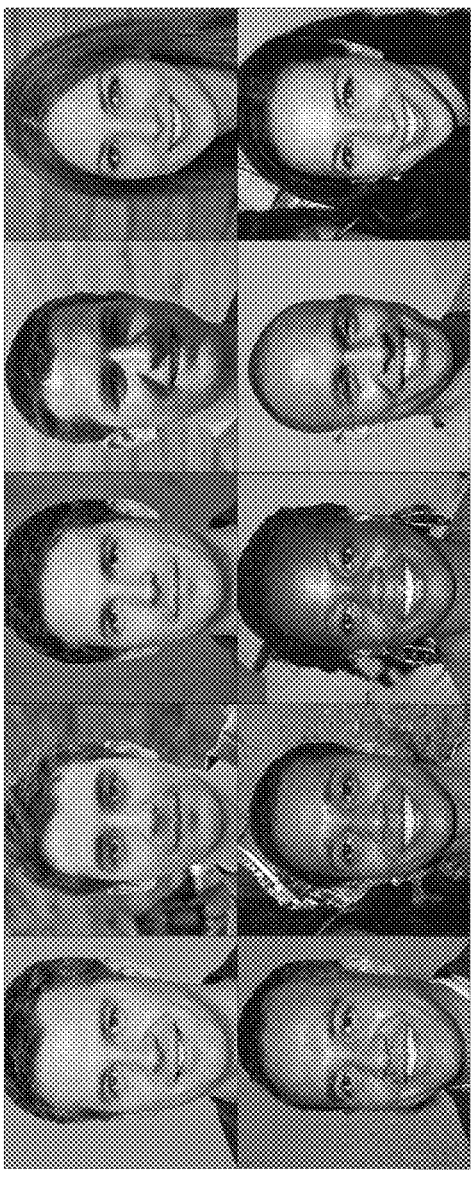
FIG. 5 illustrates, in the top row, original GAN images, and, in the bottom row, manipulated latent vector versions for model dimension 5.

StyleGAN2 was employed as a generative model g, which is pretrained on the dataset (such as Flickr-Faces-HQ (FFHQ)). Given a latent vector $z \sim p_z$, the generator g: $z \mapsto g(z) = x \in X \in \mathbb{R}^d$, where x is a face image. The latent space was traversed by training a linear model to predict single attributes from $z \sim p_z$. In aspects of the present invention, attributes correspond to the continuous dimensional values output by the model $f_\theta$. A linear support vector machine was trained to predict each dimensional value $f_\theta(g(z_i))_j$ from where j denotes the dimensional index. This results in a linear hyperplane $h_j = (w_j, b_j)$, where $w_j$ and $b_j$ are the normal vector and offset, respectively. The normal vector represents the attribute boundary, which were used to manipulate latent vectors such that the extent to which dimension j is expressed can be varied. An example of the result of this procedure is shown in FIG. 5. The latent vectors can be manipulated such that images can be generated that give rise to higher values in the model dimension 5, corresponding to "facial expression", "skin color", and "mouth related" changes. Different from conventional processes, embodiments of the present invention do not require human annotators to mitigate the inherent bias of StyleGAN2 toward generating Caucasian faces. Embodiments of the present invention can direct sampling toward germane parts of the latent space using the learned dimensions that are positively correlated with the human mental representational space of faces.

CONCLUSION

As described above, an alternative methodology for auditing the visual diversity of human face image datasets was highlighted. At its core, the methods, according to embodiments of the present invention, rely on human behavioral judgments of face similarity in order to derive a set of human interpretable dimensions, representing perceptual properties with which faces are encoded. Since the model, according to embodiments of the present invention, is completely learned through comparisons, the resulting dimensions are not biased toward features that are easier to quantify or verbalize.

Figure 6:
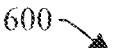
FIG. 6 provides a functional block diagram illustration of a computer hardware platform that can be used to implement a particularly configured computing device that can host a visual diversity auditing engine.

FIG. 6 provides a functional block diagram illustration of a computer hardware platform 600 that can be used to implement a particularly configured computing device that can host a visual diversity auditing engine 650. The visual diversity auditing engine 650, as discussed above, can include a training dataset 652, a test dataset 654 and a core set of dimensions 656 that are determined during training of the engine 650.

The computer platform 600 may include a central processing unit (CPU) 602, a hard disk drive (HDD) 604, random access memory (RAM) and/or read only memory (ROM) 606, a keyboard 608, a mouse 610, a display 612, and a communication interface 614, which are connected to a system bus 616.

In one embodiment, the HDD 604, has capabilities that include storing a program that can execute various processes, such as the visual diversity auditing engine 650, in a manner to perform the methods described herein.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for implicitly deriving a set of core human-interpretable dimensions from a set of images and employing the set of core human-interpretable dimensions to audit a visual diversity of an unlabeled human face image dataset, comprising:

providing a plurality of image triplets, selected from a set of images, to a plurality of participants on a display;

receiving an input from each of the plurality of participants for each of the plurality of image triplets, where the input chooses one of the images of each of the plurality of image triplets that is most dissimilar of the image triplet, wherein each input provides a human similarity judgment;

learning the set of core human-interpretable dimensions derived from the human similarity judgments;

analyzing a dataset of unlabeled human face images for visual diversity by ranking images of the dataset into the set of core human-interpretable dimensions;

determining which of the core human-interpretable dimensions are lacking representation in the dataset;

traversing a latent space of the set of core human-interpretable dimensions to synthesize images with a desired property that cures the lacking representation in the dataset; and generating a diverse set of samples from the latent space to increase the visual diversity of the dataset.

2. The method of claim 1, wherein the set of core human-interpretable dimensions are a set of core human-interpretable face-varying dimensions.

3. The method of claim 1, wherein the set of core human-interpretable dimensions express both presence of a feature and an extent of the feature.

4. The method of claim 1, wherein the set of core human-interpretable dimensions is learned solely from human behavior and is not biased toward features that are easier to verbalize or quantify.

5. The method of claim 1, further comprising generating a diversity score that characterizes the visual diversity of the dataset across the core set of human-interpretable dimensions, wherein a standard deviation provides a metric of overall diversity of the dataset, and a mean dimensional value score provides an indication of which dimensions are lacking representation in the dataset.

6. The method of claim 1, further comprising receiving an input of demographic information for each of the plurality of participants.

7. The method of claim 6, further comprising:

determining relevance of dimensions of the set of human-interpretable dimensions by measuring an extent to which the dimension are shared between different ones of the plurality of participants; and determining an annotator mask operable to down weight dimensions less relevant to a particular one of the plurality of participants.

8. The method of claim 7, further comprising increasing a predictive accuracy of the set of core human-interpretable dimensions by applying the annotator mask based on each of the plurality of participants.

9. The method of claim 1, wherein the set of images has each intersectional subgroup based on perceived binary gender expression, age group and ethnicity is approximately balanced.

10. The method of claim 1, further comprising randomly selecting, from the set of images, images for each of the plurality of image triplets.

11. The method of claim 1, further comprising using dissimilarity between pairs of images of each of the plurality of image triplets as a measure of diversity.

12. The method of claim 1, further comprising:

constructing a scale where measurement units correspond to dimensional values for each core human-interpretable dimension of the set of core human-interpretable dimensions;

receiving an input from a second plurality of participants, the input providing up to three labels for each core human-interpretable dimension;

converting the labels into broad topic categories that indicate that the dimensions can be interpreted and that there is a correspondence between the labels gathered and those generated by face image automated annotators.

13. The method of claim 12, further comprising:

receiving an input from a third plurality of participants, the input placing a plurality of unique face images along each of the scales for each of the core human-interpretable dimensions, wherein the scales are unlabeled; and constructing a human-generated similarity matrix for each dimension.

14. A method of auditing a visual diversity of an unlabeled human face image dataset, comprising:

training a model by steps comprising:

providing a plurality of image triplets, selected from a set of images, to a plurality of participants on a display;

receiving an input from each of the plurality of participants for each of the plurality of image triplets, where the input chooses one of the images of each of the plurality of image triplets that is most dissimilar of the image triplet, wherein each input provides a human similarity judgment; and learning the set of core human-interpretable dimensions derived from the human similarity judgments;

analyzing the unlabeled human face images dataset for visual diversity by ranking images of the dataset into the learned set of core human-interpretable dimensions; and generating a diversity score that characterizes the visual diversity of the dataset across the learned core set of human-interpretable dimensions, wherein a standard deviation provides a metric of overall diversity of the dataset, and a mean dimensional value score provides an indication of which dimensions are lacking representation in the dataset, wherein the unlabeled human face images are ranked for both presence of each of the learned set of core human-interpretable dimensions, an extent thereof.

15. A non-transitory computer readable storage medium tangibly embodying a computer readable program code having computer readable instructions that, when executed, causes a computer device to carry out a method of implicitly deriving a set of core human-interpretable dimensions from a set of images, the method comprising:

providing a plurality of image triplets, selected from a set of images, to a plurality of participants on a display;

receiving an input from each of the plurality of participants for each of the plurality of image triplets, where the input chooses one of the images of each of the plurality of image triplets that is most dissimilar of the image triplet, wherein each input provides a human similarity judgment;

learning the set of core human-interpretable dimensions derived from the human similarity judgments;

analyzing a dataset of unlabeled human face images for visual diversity by ranking images of the dataset into the set of core human-interpretable dimensions;

determining which of the core human-interpretable dimensions are lacking representation in the dataset;

traversing a latent space of the set of core human-interpretable dimensions to synthesize images with a desired property that cures the lacking representation in the dataset; and generating a diverse set of samples from the latent space to increase the visual diversity of the dataset.

\* \* \* \* \*